(12) United States Patent
Liu et al.

(10) Patent No.: US 7,869,705 B2
(45) Date of Patent: Jan. 11, 2011

(54) LIGHTING ARRAY CONTROL

(75) Inventors: Zicheng Liu, Bellevue, WA (US);
Mingxuan Sun, Bellevue, WA (US);
Jingyu Qiu, Bellevue, WA (US);
Zhengyou Zhang, Redmond, WA (US);
Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 12/017,047

(22) Filed: Jan. 21, 2008

(65) Prior Publication Data
US 2009/0185358 A1 Jul. 23, 2009

(51) Int. Cl.
*G03B 15/03* (2006.01)
*H04N 9/73* (2006.01)

(52) U.S. Cl. .................... 396/164; 348/223.1; 348/269; 362/11

(58) Field of Classification Search .................. 396/155, 396/4, 157, 161, 164; 348/221.1, 223.1, 348/225.1, 231.99, 269; 362/3, 11
See application file for complete search history.

(56) References Cited

U.S. PATENT DOCUMENTS

| 6,912,006 B2 | 6/2005 | Shimizu |
| 2003/0030729 A1 | 2/2003 | Prentice et al. |
| 2005/0057663 A1 | 3/2005 | Thomas et al. |
| 2006/0088210 A1 | 4/2006 | Yu et al. |
| 2007/0120879 A1 | 5/2007 | Kanade et al. |
| 2009/0073275 A1* | 3/2009 | Awazu ..................... 348/222.1 |

FOREIGN PATENT DOCUMENTS

| EP | 0812106 A3 | 5/1998 |
| GB | 2384932 A | 8/2003 |
| WO | 9740621 A1 | 10/1997 |

OTHER PUBLICATIONS

Gharai, et al., "Large Scale Video Conferencing: A Digital Amphitheater", Date: Mar. 1, 2002, pp. 1-18.
Storring Mortiz, "Computer Vision and Human Skin Colour", Date: Aug. 2004, pp. 1-177.
"blue-c: a Spatially Immersive display and 3D Video Portal for Telepresence", Markus Gross, Stephan Wurmlin, Martin Naef, Edouard Lamboay, Christian Spagno, Andreas Kunz, Esther Koller-Meier, Tomas Svoboda, Luc Van Gool, Silke Lang, Kai Strehlke, Andrew Vande Moere, Eth Zurich and Oliver Staadt, Booktitle: ACM Transactions on Graphics, 2003, pp. 819-827.
"Learning-Based Perceptual Image quality Improvement for Video Conferencing", Zicheng Liu, Cha Zhang and Zhengyou Zhang, IEEE International Conference onMultimedia and Expo, Issue date: Jul. 2-5, 2007, pp. 1035-1038.

* cited by examiner

*Primary Examiner*—Rochelle-Ann J Blackman

(57) ABSTRACT

A subject captured by a camera may be affected by environmental lighting provided by nearby light sources and the sun or moon, which may cause underexposure or overexposure of the image or aesthetically displeasing color tones. Image processing and camera adjustments may mitigate some imaging problems with limited effect and introduce undesirable side effects. A lighting array may be devised to expose the subject to various types of light (e.g., white light comprising full spectrum illumination and red, green, and blue lights comprising partial spectrum illumination) to resolve lighting problems in a more effective manner. Moreover, the lighting array may be responsively controlled to adjust the subject image with respect to one or more target spectra specifying desirable colors for the subject image. The lighting array may be iteratively controlled, e.g. by a gradient descent algorithm, for incrementally adjusting parameters with respect to proximate target spectra for the image.

20 Claims, 5 Drawing Sheets

LIGHTING ARRAY CONTROL

BACKGROUND

Modern computing defines many scenarios for the capturing of a subject with a camera, such as the capturing of an individual, and particularly a human face, with a videocamera. The capturing often involves many image processing techniques for improving the quality of the image, both during the capturing (which may be implemented within the camera) and after the capturing (which may be implemented on a computer system configured to receive the images.)

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure presents imaging techniques related to the adjustment of an image of a subject captured with a camera in order to adjust the coloration of the subject to an appealing spectrum. For example, the appearance of a user's skin tone may be adversely affected by environmental conditions, such as by fluorescent lighting or direct sunlight that makes the subject appear washed out; shadows that undesirably darken the user's skin tone, or unusually colored light, such as bluish or greenish light from a computer monitor, that renders an unnatural skin tone appearance. It may be possible to compensate for some of these effects through image processing by migrating the color values in the image to one or more sets of values that are known to be appealing. For example, a user may choose a skin tone from an earlier image captured in natural light, and the image processing techniques may be applied to adjust a video capture of the user's skin tone toward these values.

However, other scenarios may be unable to compensate for environmental factors through image processing. For example, a scene may be lit by an unusual lighting color to an extent that color processing makes the subject or the scene appear unnatural, and an undesirably dark scene may simply not provide sufficient image detail for color processing to correct. In these scenarios, it may be desirable to affect the image quality by altering the lighting of the subject and the scene, both in terms of hue and brightness. Moreover, the control of the lighting adjustment may be coupled with image processing techniques that seek a desirable color values, such as aesthetically pleasing skin tones for a human subject.

The techniques presented herein relate to active lighting for camera capturing, comprising an active lighting array having one or more partial spectrum components (such as red, green, and/or blue lights.) The brightness of the scene may be altered by similarly adjusting the brightness of the partial spectrum components, and the hue of the scene may be altered by differentially adjusting the brightness of the partial spectrum components. The active lighting array may also comprise a full spectrum lighting component (such as a white light), which may also be adjusted to alter the brightness of the scene. The active lighting adjustment may also be coupled with imaging techniques, such as white balancing and exposure adjustment within the camera, and image processing techniques, such as contrast adjustment, to achieve a well-lit subject matching a desirable spectrum in intensity and coloration.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
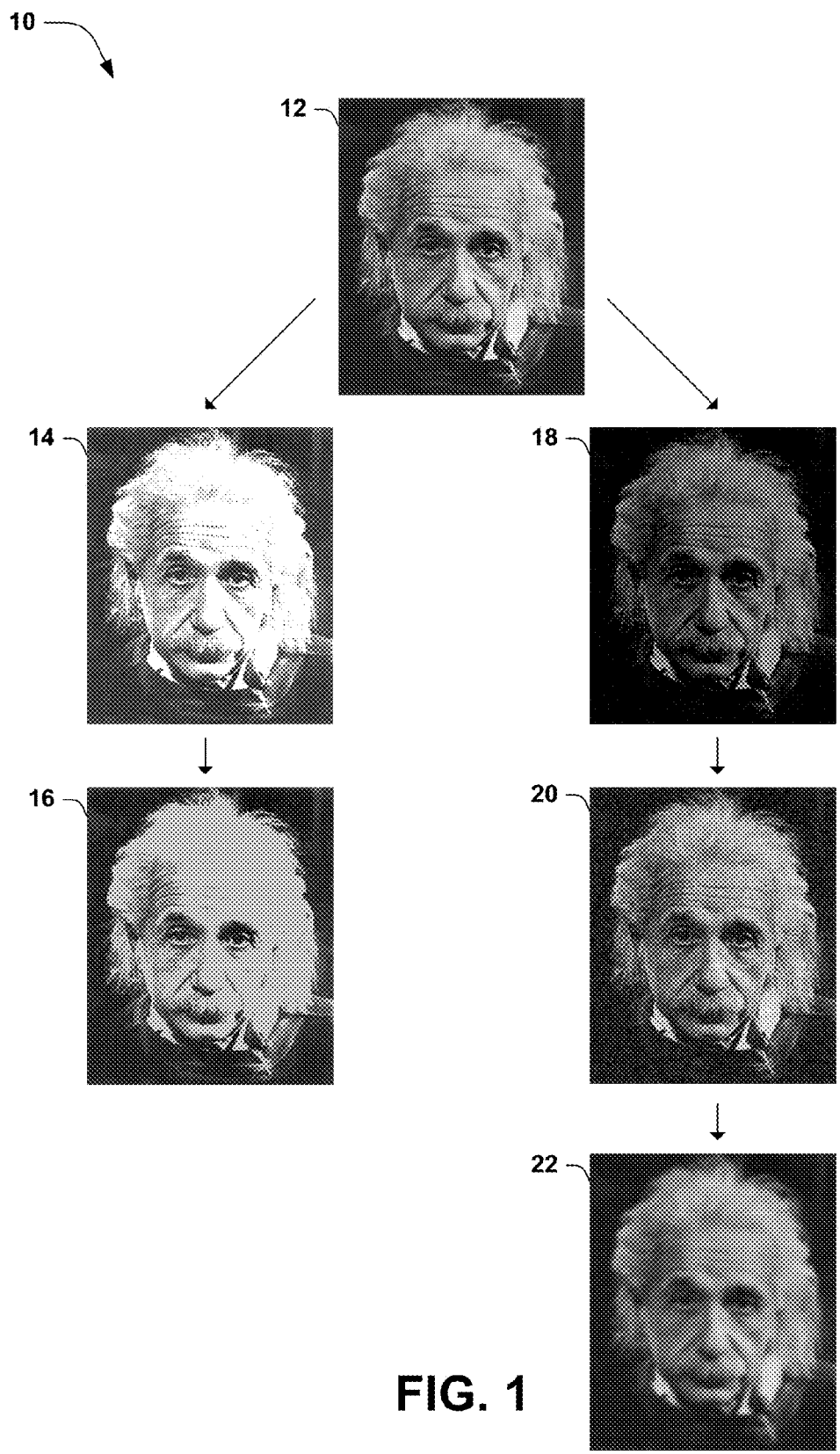
FIG. 1 is an illustration of various image processing algorithms that may be applied to an underexposed image and the effects thereof.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

The lighting of subjects by cameras, such as human subjects captured by videocameras, is a significant determinant of the resulting quality of the images produced thereby. While professional environments often involve carefully positioned lighting, many other environments (amateur, outdoors, ad hoc camera sessions, etc.) rely on the available lighting, which may or may not be conducive to aesthetically pleasing imaging. For instance, the lighting provided by a scene may be too dark, leading to underexposure and image noise; too bright, lead to sharp shadowing, bleaching of colors, and the loss of detail due to the high dynamic range of the input or low dynamic range of the image sensor; or of unnatural or imbalanced coloring, such as the overly blue or green tinge of fluorescent lighting.

Some of these effects may be mitigated by image processing techniques. For example, if the image from the camera is within its linear range, coloration issues can sometimes be corrected by adjusting image hue and saturation, and noise induced by low-light imaging can be reduced by adjusting the contrast and lightness of the image and through noise filtering techniques, such as Gaussian blur. However, these operations achieve a transformation of the image by manipulating the image data generated by the camera, and this may sometimes be inadequate or undesirable.

FIG. 1 presents some illustrations of an exemplary image under various conditions and some image processing techniques that may be used to address a lighting problem, but that introduce undesirable side effects. It will be appreciated that the depictions of FIG. 1 are presented with pronounced effects for the purpose of illustrating the problems discussed herein. In the example 10 of FIG. 1, the first image 12 presents a subject lit by ordinary lighting. Capturing the subject at an undesirably high lighting level may produce, e.g., the second image 14, having undesirably raised white levels. Image adjustment may be applied to the second image 14 to produce a corrected second image 16, which reduces the white levels of the image to acceptable levels, but which illustrates the loss of fine detail captured by the high dynamic range of the second image 14 as compared with the adequately lit image 12. Similarly, capturing the subject at an undesirably low lighting level may produce, e.g., the third image 16, having undesirably reduced contrast and low white levels. Moreover, the third image 18 also illustrates the introduction of noise that often occurs with cameras at low light levels. Again, the image may be adjusted to produce a first adjusted third image 20 which features desirable white levels and contrast, but which also accentuates the noise introduced by the low light level capturing. While a Gaussian blur may be applied to reduce the noise and to produce a second corrected third image 22, the blurring of neighboring pixels in the image data causes an apparent loss of detail, which may be appreciated with comparison to the adequately lit image 12.

It may be appreciated that some of the problems illustrated in FIG. 1 are a byproduct of the lighting of the subject, which may be addressed by manipulating the data of the image to improve the quality of the images, but may not be able to correct deficiencies and may introduce undesirable side effects. Although color issues are difficult to illustrate with black-and-white images, it may also be appreciated that a subject captured in an unusually colored lighting environment (e.g., the overly bluish or greenish lighting provided by fluorescent lighting, such as in some office environments) may be partially corrected by adjusting the hue and saturation of an image. However, such adjustment may improve some colors of an image while reducing the quality of others; e.g., increasing the saturation of an overexposed image to correct for some washed-out colors (e.g., the skin tone of a subject) may cause other colors in the image to appear unnaturally and undesirably bright or vivid.

An alternative technique that may be used alternatively or in addition to adjusting the image data captured by a camera involves an active readjustment of the environmental lighting to address subject lighting issues. A sample image of a subject may be captured with a camera and analyzed with regard to one or more lighting aspects, such as light intensity, light coloring, white balancing, and exposure, and one or more aspects of the active lighting may be adjusted to alter the lighting of the subject. Moreover, the lighting may be adjusted according to one or more target values that comprise aesthetically pleasing qualities. For example, color information comprising attractive skin tones may be captured, and upon capturing a test image of a human subject, the active lighting may be automatically adjusted in order to migrate the skin tone of the human subject toward more appealing skin tone coloration. The active lighting adjustment may be significant to account for major problems or subtle to provide a mild improvement, and may be multifaceted (e.g., some lighting input from a red lighting component provided to correct a red spectral deficiency in an image, and from a white lighting component provided to correct an overall dimming of the image.) These techniques may be used in conjunction with others, e.g., automatic white balancing and exposure adjustment to provide an advantageous camera exposure for the scene, to produce an image of a scene subjected to both active lighting adjustment and passive manipulation of the camera and image to alter the imaging of a subject based on aesthetically appealing heuristics.

Figure 2:
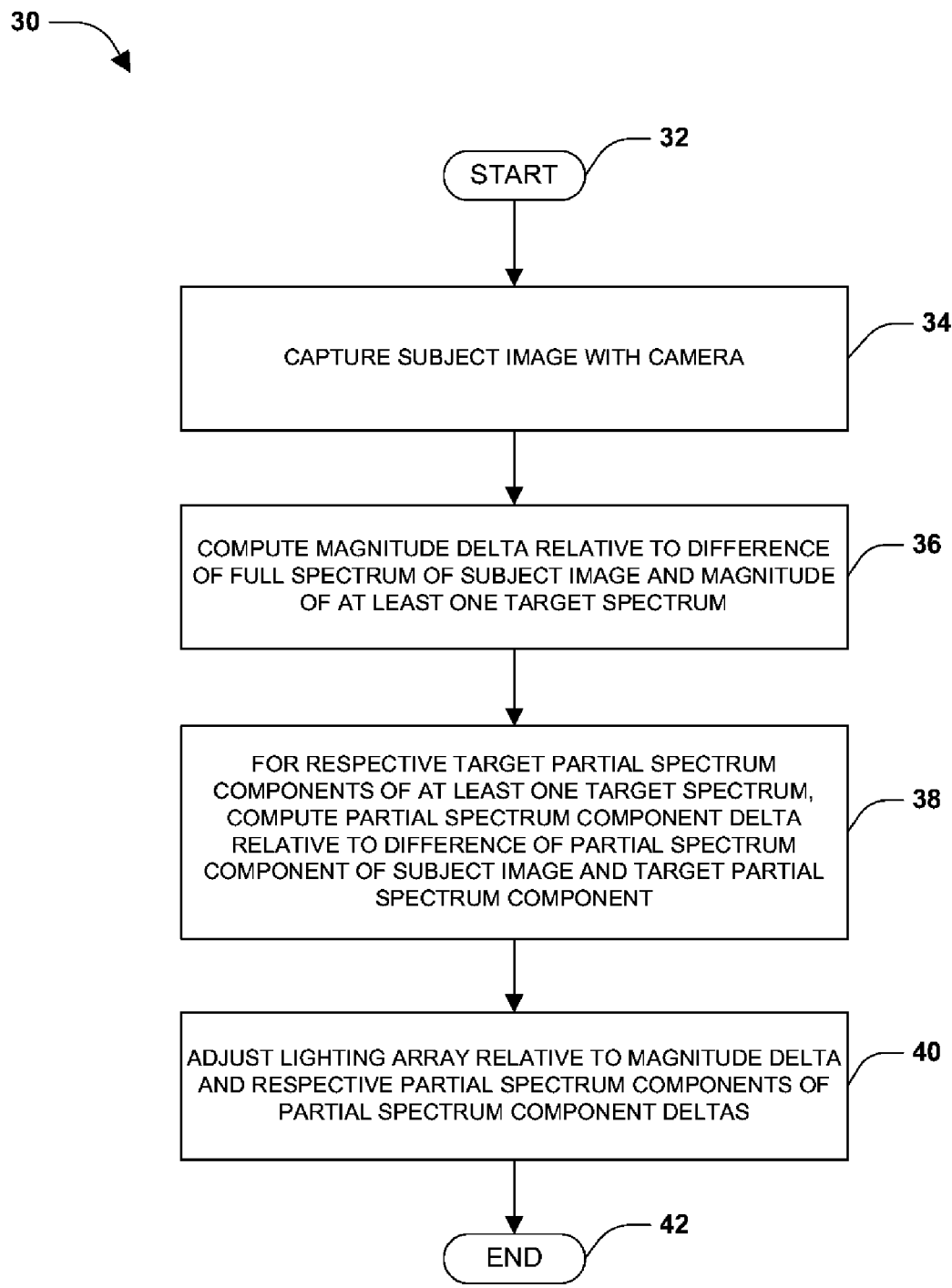
FIG. 2 is a flow diagram illustrating an exemplary method of controlling a lighting array to light a subject captured by a camera according to at least one target spectrum.

FIG. 2 illustrates one embodiment of these techniques, comprising an exemplary method 30 of controlling a lighting array comprising at least one partial spectrum lighting component according to at least one target spectrum having at least one target partial spectrum component. The exemplary method 30 is applied to adjust the lighting of a subject captured by a camera in order to migrate the spectrum of the subject toward some aesthetically appealing spectrum values represented by the at least one target spectrum. The exemplary method 30 begins at 32 and involves capturing a subject image with the camera 34. The subject image may comprise an entire image captured by the camera, or may comprise a portion of the image captured by the camera that contains the subject. The exemplary method 30 also involves computing a magnitude delta relative to the difference of the magnitude of the spectrum of the subject image (i.e., the overall brightness of the image) and the magnitude of the at least one target spectrum. For example, this computation may involve calculating the difference of the brightness of the subject image and the brightness of the target spectrum toward which the image is to be migrated. The exemplary method 30 also involves computing a partial spectrum component delta for respective target partial spectrum components of the at least one target spectrum, wherein the delta is relative to the difference of the partial spectrum component of the subject image and the target partial spectrum component 36. For example, partial spectrum component deltas may be computed for a red color channel, a green color channel, and a blue color channel in an RGB-format image by subtracting the color channels of the subject image from the corresponding color channels of the target spectrum. The exemplary method 30 also involves adjusting the lighting array partial spectrum lighting components relative to the magnitude delta and respective partial spectrum components of the partial spectrum component deltas 40. For example, if the lighting array comprises a red lighting component, a green lighting component, and a blue lighting component, the components may be adjusted cooperatively relative to the magnitude delta, and differentially relative to the RGB color channel deltas. By adjusting the lighting array relative to the difference of the subject image and the target spectrum, the exemplary method 30 thereby achieves an improved lighting of the subject, and so ends at 42.

Figure 3:
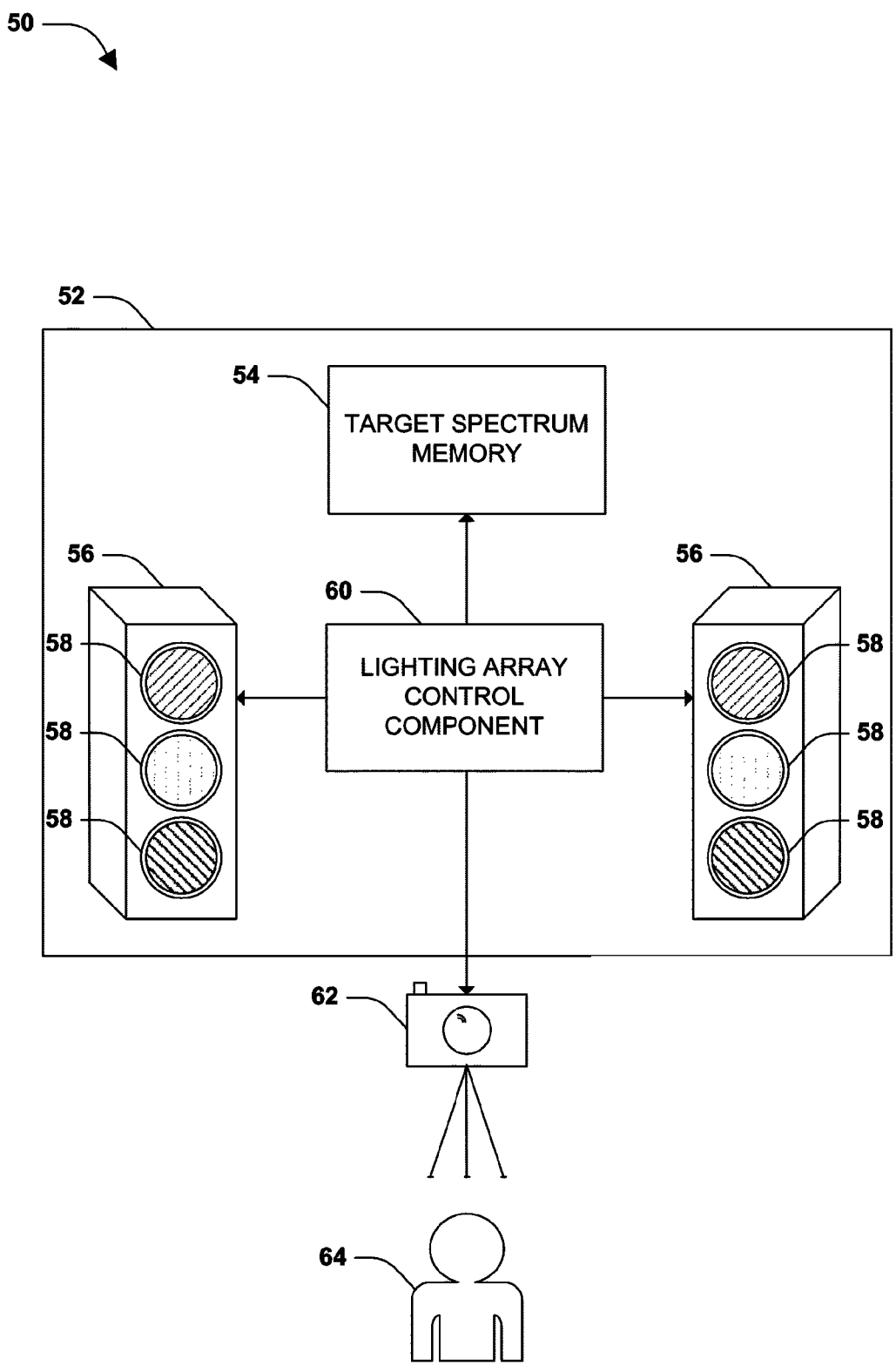
FIG. 3 is a component block diagram illustrating an exemplary system for controlling a lighting array to light a subject captured by a camera according to at least one target spectrum.

FIG. 3 presents another embodiment of these techniques, comprising an exemplary system 52 for lighting a subject image of a subject captured by a camera. The exemplary system 52 in this example 50 is operably coupled with a camera 62 positioned to capture an image of a subject, such as a human subject 64, and is configured to adjust the lighting of the subject based on an analysis of a subject image of the subject 64 captured by the camera 62. The exemplary system 52 comprises a target spectrum memory 54, which is configured to store at least one target spectrum having at least one target partial spectrum component. For example, the target spectrum memory 54 may contain one or more target spectra representing aesthetically appealing spectra for photographic subjects such as the human subject 64. The exemplary system 52 also comprises a lighting array 56 configured to light the subject 64, the lighting array 56 comprising at least one partial spectrum lighting component 58. For example, the lighting array 56 may comprise a red lighting component, a green lighting component, and a blue lighting component, which may be individually controlled for various lighting alterations of the subject 64. The exemplary system 52 also comprises a lighting array control component 60, which is configured to compute a magnitude delta relative to the difference of the magnitude of the spectrum of the subject image and the magnitude of the target spectrum; to compute a partial spectrum component delta for respective target partial spectrum components of the target spectrum relative to the difference of the partial spectrum component of the subject image and the target partial spectrum component; and to adjust the partial spectrum lighting components 58 of the lighting array 58 relative to the magnitude delta and to the respective partial spectrum components of the partial spectrum component deltas. By adjusting the partial spectrum lighting components 58 to adjust the lighting of the subject 64 toward the target spectra stored in the target spectrum memory 54, the exemplary system 52 thereby adjusts the lighting of the subject to produce a subject image with aesthetically improved image qualities.

The techniques described herein may be implemented with variations in many aspects, and some variations may present some additional advantages and/or reduce disadvantages relative to other variations of these and other techniques. Some of these aspects and variations thereof are discussed herein, which may be included in some embodiments (such as the exemplary method 30 of FIG. 2 and the exemplary system 52 of FIG. 3) to achieve various ends.

Figure 4:
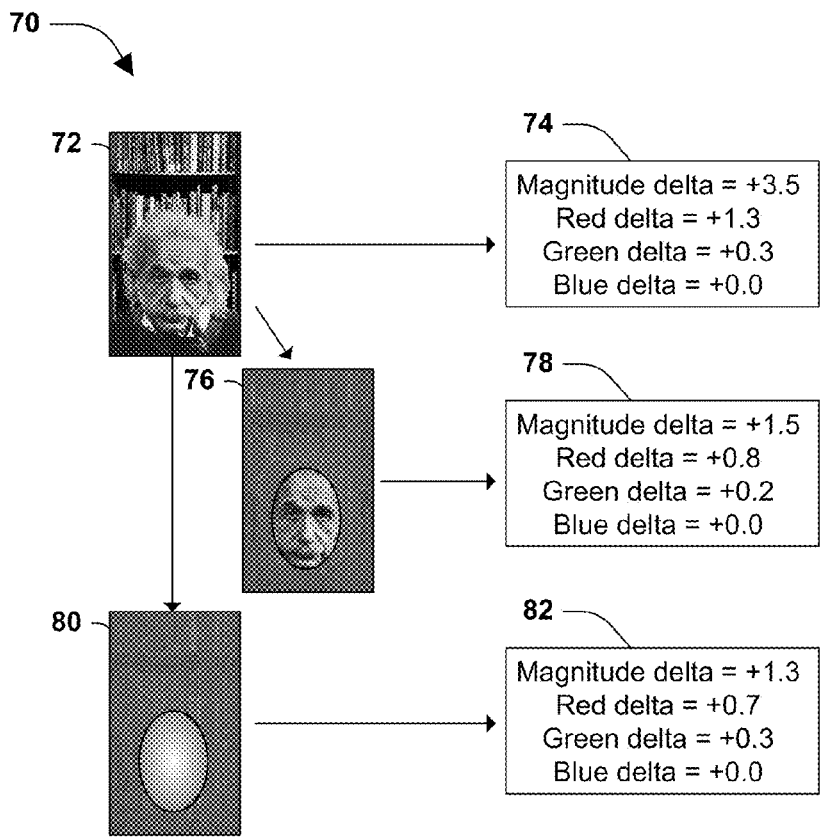
FIG. 4 is an illustration of various techniques for selecting a human face from an image and for factoring the selected human face into the imaging techniques described herein.

A first aspect that may vary among implementations relates to the nature of the subject and to the camera with which the subject image is captured. As one example, the camera may comprise (e.g.) a still camera, a videocamera, a microscopic or telescopic camera, a medical or physical imaging camera, etc., and may capture images according to various imaging properties (through certain kinds of filters, or with various focal or exposure settings, etc.) As a second example, the techniques disclosed herein may be applied to a general-purpose camera for images of any appropriate subject, and these techniques may be used to migrate some aspects of such images, such as brightness and coloration, toward some values that may in general be aesthetically pleasing, such as particular colors that are appealing to the human eye. As a third example, the techniques may be adapted with regard to a particular type of camera, such as for adjusting coloration and brightness of low-light scenes captured by a low-light camera, or for lighting an underwater scene to be captured by an underwater camera (e.g., for use with an aquarium.) As a fourth example, the techniques may be customized with regard to a type of image subject, such as a human subject; in this variation, these techniques may be used to adjust the lighting of the human subject with regard to some aesthetic aspects relative to human portraits, such as toward aesthetically pleasing skin tones. In particular, the techniques may be customized with respect to a human face, and may be applied to images with respect to target spectra that comprise aesthetically pleasing flesh tones to produce an improved portrait. The human face may be selected as the subject image from an image captured with the camera. Such selection may be manual, or may involve a face recognition algorithm that is configured to identify human faces by shape and features. Many such face recognition algorithms are available, and a wide number of them may be compatible with the techniques disclosed herein.

Where the techniques are applied to a subject image selected as a portion of an image captured with the camera, the techniques may be applied in a few different ways. FIG. 4 illustrates some examples 70 in which such techniques may be applied in the context of a human face selected from a portrait image. As one example, the techniques may be directed to analyze the entire image 72 that contains a human face, to calculate a magnitude delta and partial spectrum component deltas 74 based on some advantageous skin tones, and may adjust the lighting of the subject (and the scene) to promote such values. The adjusted lighting may naturally alter the lighting of the entire scene due to reflectance, but it might be possible, e.g., to focus the lighting array on the subject image (e.g., on the face of the human) to limit the alteration of the other portions of the scene.

As a second example, a more computationally intensive, but perhaps more accurate, technique may involve selecting a subject image 76 comprising human face from the image, analyzing the subject image 76 with respect to the at least one target spectrum, and calculating a magnitude delta and partial spectrum component deltas 78. These techniques may promote the lighting of the scene with more accuracy as to the skin tones desired in the subject image, and with less skewing of the spectral analysis based on the unrelated elements in the scene (e.g., the colors of the books behind the subject image 76 in these examples 70.)

As a third example, these techniques may be even more specifically adapted to select the subject image 80 and to analyze the subject image 80 with a weighted gradient to compute the magnitude delta and the partial spectrum component deltas 82, such that a targeted portion of the subject image 80 is more accounted for in the migrating than other portions of the subject image 80. This may achieve an even more accurate spectral analysis and lighting adjustment by evaluating the subject image 80 with regard to a portion of the subject image 80 that might be closest to the target spectrum. For example, a face recognition algorithm may identify a forward-looking human face in an image, and it may be presumed that the curvature of the face creates color variations through shadowing that are not as indicative of natural skin tones, whereas the center of the face may present the most natural, consistent, and significant skin tones for the image. Accordingly, the techniques may more significantly weight the center of the subject image 80 for the purpose of computing the magnitude delta and the partial spectrum component deltas 82, may less significantly weight the peripheral areas of the subject image 80, and may not evaluate the other portions of the image. This differential weighting may be able to produce an image of a subject lit to migrate the more significant portions of the subject image toward the target spectra, with the more peripheral regions and background exposed to the same lighting arrays but having less impact on the magnitude delta and the partial spectrum component deltas. Many other variations in the application of these techniques to various types of cameras and subjects may be devised by those of ordinary skill in the art while implementing the techniques discussed herein.

A second aspect of these techniques that may vary among implementations relates to the configuration of the lighting array. As one example, the partial spectrum components may be chosen in many combinations to achieve various ends. The choice of red, green, and blue components may be advantageous for providing primary colors of lighting that reproduce a broad spectrum of the visible color space, and may be appealing for matching the configuration of red, green, and blue cones of the human retina. However, the ability to reproduce the broad spectrum of colors with such elements is dependent on the reproduction of the primary colors of red, green, and blue light from the respective partial spectrum components, and any deviation in one component may result in a narrowing of the reproducible spectrum for adjusting the lighting of the subject. For instance, if the red lighting component provides a somewhat bluish tinge of red light (i.e., a hue of red falling slightly on the side of purple), it may not be possible to adjust the lighting of a subject by adding primary red light. Other configurations of light may be capable of adjusting the coloring of a lit scene, and many combinations of colors that approximately form a triangle on an additive color circle form may be chosen that provide a wide range of coverage of the color spectrum, though not as wide as the primary color combinations. As one example, a lighting array comprising yellow, magenta, and purple-blue may be capable of reproducing a broad range of colors. The lighting array may also be configured with fewer than three colors to produce a less complex (and potentially less expensive) lighting array capable of a narrower range of colors. For example, a lighting array comprising two complementary colors may be adequate for reducing some lighting deficiencies; e.g., underwater is already heavily skewed toward blue, and a lighting array comprising green and red lighting may be sufficient for a wide range of desirable color adjustments of underwater subjects.

As another example, the lighting array may also be configured to provide full spectrum lighting adjustment. A lighting array configuration having three opposing colors may be able to achieve a similar effect by proportionally increasing the three colors. However, it may be difficult to maintain proportionality of the lighting as the three lighting components increase in intensity; for instance, one lighting component may subtly shift colors at higher intensities to provide a less balanced full-spectrum adjustment. Also, it may be difficult to achieve finely tuned hue adjustments if the three lighting components are operating near maximum lighting capacity. As an alternative, the lighting component may contain a full spectrum lighting component, which may produce varying amounts of white light in order to adjust the magnitude of the lighting of the subject without altering the hue of the lighting. Controlling the lighting array (e.g., through a lighting array control component 60 as in the exemplary system 52 of FIG. 3) may therefore involve adjusting the full spectrum lighting component relative to the magnitude delta, which may replace or supplement the adjusting of the partial spectrum lighting components relative to the magnitude delta. This addition may permit the adjustment of the lightness and saturation of the scene without altering the hue of the subject, which may be independently corrected by the partial spectrum lighting components. These techniques may therefore be applied to achieve a broad range of adjustments in the lightness, saturation, and hue of the lighting of the scene and subject. Many variations in the configuration of the lighting array may be devised by those of ordinary skill in the art while implementing the techniques discussed herein.

Figure 5:
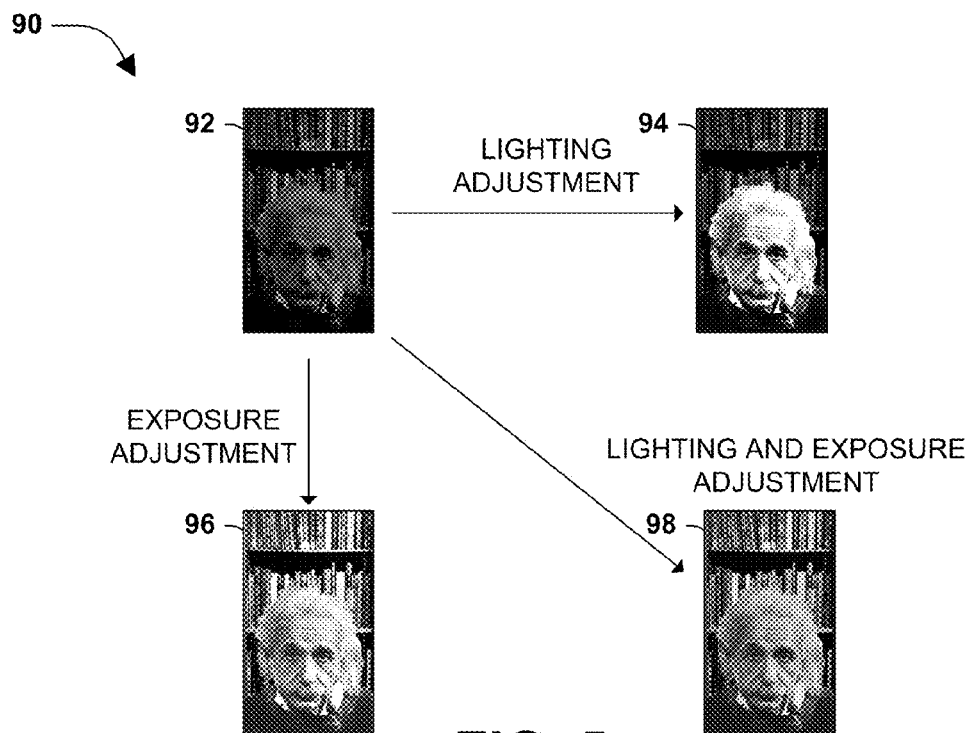
FIG. 5 is an illustration of an exemplary underexposed subject corrected according to a lighting adjustment, an exposure adjustment, and a lighting adjustment with an exposure adjustment.

A third aspect of these techniques that may vary among implementations relates to the cooperative coupling of the lighting array control and some other image adjustment features that may be included in the camera or image processing hardware or software. If the conjunctive effects of these adjustments on the lighting of the subject in the subject image can be formulated, then these techniques may be implemented to operate the lighting array and the other image adjustment features in tandem to achieve a desired image. As one example, a white balancing adjustment may be performed in order to adjust the subject image with a white balance correction value. This may be helpful, e.g., if the optics of a camera happen to reflect an incorrect composition of colors, such that all colors are sampled as if tinted toward a particular color. For instance, if a camera is skewed toward slightly warm colors that impart a reddish tint to the image, then all objects may appear redder than in reality, and even a naturally white object may appear slightly pink. To mitigate this problem, a white balancing adjustment may be performed that offsets the sampled values of the subject image to counteract an incorrect tint. The white balancing adjustment may be a hardware and/or software component of the camera, or a feature of an image processing component provided by a hardware or software package, etc. One technique for performing white balancing adjustment involves calibrating the camera against a pure white object, sampling an image of the object, and computing a white balancing correction value (e.g., reducing the red component of the image by −0.12% and the green component of the image by −0.04%.) The white balancing adjustment may then be applied to subject images captured during the photography session. Another technique for performing white balancing adjustment involves detecting the typical skew of the camera, such as by the same manner, and then applying the white balancing correction value to any images subsequently captured with the camera during any photography session. Those of ordinary skill in the art may be capable of devising many techniques for performing a white balancing adjustment of the subject image while implementing the techniques discussed herein. As a second example, a camera exposure adjustment component may be operably coupled with the camera to permit the adjustment of exposure-related elements, such as shutter speed and/or aperture size, in order to alter the properties of the camera to adjust for ambient lighting, depth of field, and the capturing period. Moreover, the adjustment of the camera exposure may achieve complementary but different effects than the adjustment of the lighting component (e.g., the adjustment of a full spectrum lighting component.) For instance, increasing the full spectrum lighting component may shed more light directly on the subject without necessarily lighting the scene, and may improve the lightness of colors but may desaturate some of colors at higher intensities. By contrast, increasing the exposure of the camera may produce a greater light sampling that increases the apparent lighting of the entire scene (not just the subject), which may produce adequate color saturation but may with inadequate lightness. FIG. 5 illustrates an example 90 of a first image 92 of a subject captured in dimly lit conditions. A lighting adjustment may produce a first adjusted image 94 that sheds some light on the subject but introduces a lighting contrast with the scene, while an exposure adjustment may produce a second adjusted image 96 having a slight overexposure for both the subject and the scene. A combination of modest full-spectrum lighting adjustment and exposure adjustment may produce a third image 98 having a desirably lit subject set against a well-exposed scene.

Accordingly, it may be advantageous to couple the control of various properties of the camera in order to adjust the subject image toward the target spectrum while also maintaining or improving other properties of the subject image. As one example, an embodiment may operably couple a lighting array control component 60 of the exemplary system 52 of FIG. 3 and a white balancing adjustment component in the camera that adjusts the white balance of the image with a white balance correction value, e.g., by adjusting the color components of the subject image. As another example, an embodiment may operably couple a lighting array control component 60 of the exemplary system 52 of FIG. 3 and the camera exposure adjustment component, and may adjust the camera exposure adjustment component relative to the magnitude delta computed to adjust the subject image toward a target spectrum in accordance with these techniques. For instance, an embodiment might improve the imaging of a dimly lit scene by cooperatively controlling the lighting array and the camera exposure adjustment component in order to provide a small amount of full spectrum lighting and a modest increase in the exposure of the camera, which may produce well-saturated and adequately lit colors, and may balance a lightening of the subject with improved overall exposure of the scene. The adjustment of the camera exposure adjustment component may be directly related to the magnitude delta (e.g., an increased delta may increase both the full spectrum output of the lighting array, and may also increase the camera exposure), or may be indirectly related to the magnitude delta (e.g., as the full spectrum output of the lighting array is adjusted relative to the magnitude delta, the camera exposure may be responsively adjusted to achieve a desirable balance between lighting and exposure.) Moreover, the camera exposure adjustment component may have a minimum exposure and a maximum exposure representing the aperture and shutter speed adjustment capabilities of the camera, and the adjusting may be limited to the range between the minimum exposure and the maximum exposure. Those of ordinary skill in the art may be able to devise many cooperating couplings of the control of the lighting array and various properties of the camera while implementing the techniques provided herein.

A fourth aspect that may vary among implementations of the techniques presented herein relates to the selection of the one or more target spectra, toward which the spectra of the subject image (or a portion thereof, as illustrated in FIG. 4) may be migrated to produce an aesthetically improved subject image. As one example, a target spectrum may be specified, such as by choosing a color by red/green/blue (RGB) intensities or hue/saturation/brightness (HSB) measurements, toward which the colors of a subject image may be adjusted through the use of full and partial spectrum lighting components. The chosen spectrum may be a general measurement (e.g., an aesthetically pleasing color for a characteristic piece of fruit, such as a banana, toward which images predominantly comprising such pieces of fruit may be adjusted), or may be specific for a subject (e.g., an attractive skin tone for a particular individual under balanced indoor lighting, toward which other images of the individual in similar conditions may be migrated.) As another example, the target spectrum may be computed, such as through a trainable learning computer algorithm that presents images of individuals having various skin tones to users for ratings based on aesthetic appeal. The responses of the users may be provided to a trainable learning algorithm, such as a backpropagating artificial neural network or a statistical analysis algorithm, for determining a desirable target spectrum. As a third example, a set of target spectra may be selected representing several (or even many) aesthetically appealing colors toward which a subject image may be migrated. These techniques may therefore be applied to analyze some visual features of a sample image, to determine a target spectrum near the sample image, and to migrate the sample image toward the selected target spectrum. The set of target spectra may again be intentionally selected and/or derived from user selections by a learning algorithm. Many techniques for designating the at least one target spectrum for use as described herein may be devised by those of ordinary skill in the art.

A fifth aspect that may vary among implementations of these techniques relates to the qualitative aspects of the computational techniques for adjusting the subject image based on the at least one target spectrum. A first exemplary qualitative aspect relates to the rate of the adjustment, which may be selected from small and large adjustment rates in relation to the deltas computed for adjusting the full and partial spectrum lighting components of the lighting array. Larger increments may be useful for larger adjustments. However, a large change in the adjustment intensity of a lighting component might involve a noticeable timing delay as the lighting device responds with a significant intensity change. Additionally, the relationship between a delta and an adjustment to a lighting component (such as the variable voltage applied to a lighting device to produce a lighting intensity), and might be dependent on many other factors, such as the interrelationship between a full spectrum lighting component and the various partial spectrum lighting components, exposure adjustment of the camera, and the albedo of the scene and the subject. Large adjustments may therefore involve a noticeable delay in adjusting the lighting device, and the approximation might significantly overadjust a lighting component, especially where the delta is large. As a result, a large rate of change may result in significant back-and-forth adjustments that may be time-consuming and inefficient. As an alternative, it may be advantageous to make small adjustments in the lighting array before reassessing the quality of the image and making additional adjustments.

Accordingly, the techniques discussed herein may be iteratively applied to migrate a subject image toward one or more target spectra in small increments. The lighting array may be initialized to an initial lighting array output, e.g., where each lighting array component is lightly powered to produce a small amount of irradiance (such that the lighting array control computations may reduce the output of a component if desirable.) Each iteration may involve capturing a subject image, performing some computations to determine a magnitude delta (representing the change in the overall brightness of the scene, such as may be achieved by increasing a full spectrum lighting component) and partial spectrum component deltas (e.g., red/green/blue partial spectrum component deltas, or hue, saturation, and intensity values that more qualitatively describe the changes to be made), and making a comparatively small adjustment to the intensities of the lighting array with respect to the current outputs (produced by a previous iteration) before conducting a subsequent iteration. These iterations may be performed, e.g., by a lighting array control component that is configured to initialize the lighting array and to iteratively capture and adjust the subject image.

A second example of the qualitative aspects of the computation relates to the color models used in the transformation. The selection of a color model for representing at least one target spectrum and the subject images may create advantages or disadvantages, such as more or less efficient calculation, while performing the quantitative aspects of these techniques. Where the lighting spectrum comprises at least one of a red spectrum lighting component, a green spectrum lighting component, and a blue spectrum lighting component, it may be efficient to describe the target spectra according to red, green, and blue components, and to process the subject images according to an RGB data format. Alternatively, where the lighting spectrum comprises a full spectrum lighting component, such as a white lighting component, it may be efficient to describe the target spectra and to process the subject images according to a hue/saturation/lightness (HSL) color model, such that the lightness of the spectral representations can be more directly mapped to the output of the white lighting component, while the partial spectrum components may be calculated from the hue, saturation, and lighting components. Other scenarios may be advantageously compatible with other color models, such as HSV, HSB, or YCbCr color models, which may expose certain aspects of the color and lighting selection that may be advantageous (e.g., YCbCr may be advantageous for more broad and finely detailed hue representations where hue is a more significant aspect of the imaging techniques.) The selection of a color model may also be related to the output of the hardware, such as the color model used by the camera to encode the subject images. However, those of ordinary skill in the art may be able to choose many compatible color models for implementing the techniques discussed herein.

A third example of the qualitative aspects of the computation that involve iteration relates to the determination of an end point for the computation. The iterative processing may be performed until an end point is reached, such as a subject image adequately lit by the lighting apparatus so as to yield desirably small differences between the measured properties of the subject image and one of the target spectra. Accordingly, the techniques may involve the designation of a magnitude delta threshold and one or more partial spectrum component delta thresholds, such that the iteration is performed while the magnitude delta exceeds the magnitude delta threshold and/or one or more of the partial spectrum component deltas exceeds the partial spectrum component delta threshold. The techniques might also be assessed to determine whether successive iterations yield progress in the migration of the subject image toward one of the target spectra, e.g., by continuing the iterative processing as long as the magnitude delta and the partial spectrum component deltas of each iteration are lower than the magnitude delta and the partial spectrum component deltas of previous iterations. Finally, the end point may be a simple time threshold, beyond which the lighting array adjustment is discontinued. Alternatively, the lighting array adjustment may continue, which may provide additional continuity during lighting changes (e.g., during the progression of a sunrise), and/or may be gradually reduced, such as by reducing the adjustment rate of the lighting array to a small value over time. Those of ordinary skill in the art may devise many qualitative variations in the computational processing of the techniques described herein.

A fourth example of the qualitative aspects of the computation relates to the manner of adjusting the components of the lighting array based on the magnitude delta and the partial spectrum component deltas. It may be appreciated that the relationship between the quantitative adjustment of an aspect of the subject image (e.g., increasing the blue coloring by 0.05 and increasing the magnitude by 0.08) may not directly translate to an adjustment of the output of the lighting component; e.g., the relationship between the power supplied to a lighting component and the irradiance produced by the lighting component may not be linear. Similarly, the irradiance of a lighting component may not have a linear relationship with the apparent adjustment of the corresponding spectrum component in the subject image. The relationships are likely to be direct (i.e., not inverse) and may be approximately proportional, but may not be linear or consistent. Embodiments of these techniques may adapt to this imprecision by providing only qualitative approximations in the adjustment of the components of the lighting spectrum, and progress toward the target spectrum may comprise a trial-and-error process. Alternatively or additionally, some measure of quantification may be preserved by mapping or mathematically modeling some of the relationships. For instance, the irradiance of the spectrum lighting components may be calibrated with regard to the power input (e.g., voltage) provided to the spectrum lighting components, such that an adjustment of the power input may later be selected to achieve a desired quantitative change in the irradiance of a spectrum lighting component, or the anticipated irradiance of a spectrum lighting component may be calculated based on a specified power input. The lighting response of the scene in response to variations in irradiance may also be computed, such as through a metering phase that measures the lighting response of the scene and subject in response to various lighting component samplings. Those of ordinary skill in the art may be capable of devising many adjustments of these computations in view of the complexities of the lighting array and the lighting response of the scene and subject in accordance with the techniques set forth herein.

A sixth aspect that may vary among implementations relates to the quantitative methods of computing the full spectrum magnitude and the partial spectrum component magnitudes. The techniques described herein suggest the computation of a magnitude delta, which may be useful for adjusting the lightness of the lighting, and partial spectrum component deltas, which may be useful for adjusting the coloration of the lighting, as well as the adjustment of the lighting array relative to these computed deltas. Many variations may arise in the manner of computing these values and adjusting the components of the lighting array relative to the deltas. As one example, the range of achievable lighting characteristics of the subject and scene may be regarded as a search space, and the irradiance of the lighting components may be regarded as variables for an approximate function into the search space. The dimensionality of the search space may be specified with regard to the number and types of lighting components (e.g., a lighting array having red, green, blue, and white components may comprise a three-dimensional RGB search space, wherein adjustments in the irradiance of a partial component approximately moves the subject image along one axis, and adjustments in the irradiance of the full spectrum component moves the subject image along all three axes.) The control of the lighting array may be formulated as an incremental adjustment of the parameters (i.e., the irradiance of the full and partial spectrum lighting components) producing various positions in the search space (i.e., the measured properties of the subject image in response to such irradiance adjustments.)

The computations and adjustments may be devised according to the search problem perspective of these techniques. Where the subject image is to be migrated toward a particular target spectrum, the computational processes may be formulated as an optimization problem to choose outputs of the lighting array so as to seek an increasing proximity with respect to the target spectrum. Where the subject image is to be migrated toward one among a set of target spectra, the computational processes may be formulated as a gradient descent problem, such that the adjustment comprises a vector in the search space based on the proximities of the current subject image to various target spectra within the search space.

An exemplary gradient descent formulation may be devised according to the following mathematical formulae, which seek to operate a lighting array in order to adjust the lighting of a subject with regard to one or more target spectra. The mathematical formulae are devised to operate a lighting array comprising a white full spectrum component, a red partial spectrum component, a green partial spectrum component, and a blue partial spectrum component, and include input relating to the exposure of the camera and the albedo of the subject and scene. The mathematical formulae also involve a calibration of the voltage-to-irradiance properties of the full and partial spectrum components of the lighting array. The mathematical formulae are provided as an iterative process of gradient descent, such that the output of iteration $i+1$ is determined as an adjustment of the output of the components of the lighting array with respect to the spectral analysis of the subject image produced at iteration i in relation to the target spectra, the albedo of the scene and subject, and the exposure of the camera. The adjustment of an iteration is thereby quantified according to the following mathematical formula:

$$(v_r, v_g, v_b, v_w)^{i+1} = (v_r, v_g, v_b, v_w)^i - \gamma \nabla G$$

where:
$v_r$ represents a voltage applied to power a red lighting component of a lighting array;
$v_g$ represents a voltage applied to power a green lighting component of a lighting array;
$v_b$ represents a voltage applied to power a blue lighting component of a lighting array;
$v_w$ represents a voltage applied to power a full spectrum lighting component of a lighting array;
i represents an iteration of a lighting array control algorithm;
$(v_r, v_g, v_b, v_w)^i$ represents a voltage applied to power the red, green blue, and full spectrum lighting components of a lighting array for an iteration of a lighting array control algorithm;
γ represents an adjustment rate factor controlling the rate of change of the lighting array between iterations of a lighting array control algorithm; and
G represents a gradient descent lighting array control formula; and
∇G represents a gradient of a gradient descent lighting array control formula.

The use of this mathematical formula may thereby inform the adjustment of the lighting array (and, in particular, the voltages supplied to the various components comprising the lighting array) based on the current output. This mathematical formula also provides rate control in the form of γ, which may be adjusted to achieve a suitable rate of adjusting the lighting array in seeking a target spectrum.

The gradient descent lighting control formula may comprise the mathematical formula:

$$G = \sum \left( \frac{1}{2}(I - I_t)^T (I - I_t) \right), t \in S,$$

where:
S represents the set of target spectra;
I represents a linear estimation of the red, green, blue, and white channels of an image resulting from applying voltages $v_r$, $v_g$, $v_b$, and $v_w$ to the red, green, blue, and white lighting components of the lighting array during an iteration of a lighting array control algorithm; and
$I_t$ represents a target spectrum comprising red, green, and blue channels.

The gradient descent formula therefore analyzes the current subject image and produces a matrix defining a vector within the search space based on the proximities of the target spectra comprising the set S. Accordingly, ∇G may be devised to represent a gradient of a gradient descent lighting array control formula according to the mathematical formula:

$$\nabla G = \left[ \frac{\partial G}{\partial v_r} \quad \frac{\partial G}{\partial v_g} \quad \frac{\partial G}{\partial v_b} \quad \frac{\partial G}{\partial v_w} \right]^T.$$

Finally, the function I used in the linear estimation of the red, green, blue, and white spectrum components of the lighting array comprises the mathematical formula:

$$I = k\rho \begin{bmatrix} A_{r1} & A_{g1} & A_{b1} & A_{w1} \\ A_{r2} & A_{g2} & A_{b2} & A_{w2} \\ A_{r3} & A_{g3} & A_{b3} & A_{w3} \end{bmatrix} \begin{bmatrix} v_r \\ v_g \\ v_b \\ v_w \end{bmatrix} + k\rho E^{room}$$

where:
k represents the camera exposure,
ρ represents the albedo of the subject,
$A_{r1}$, $A_{r2}$, etc. together represent a voltage-to-irradiance approximation of the red, green, blue, and white lighting array components of the lighting array, and
$E^{room}$ represents the irradiance of the scene.

Figure 6:
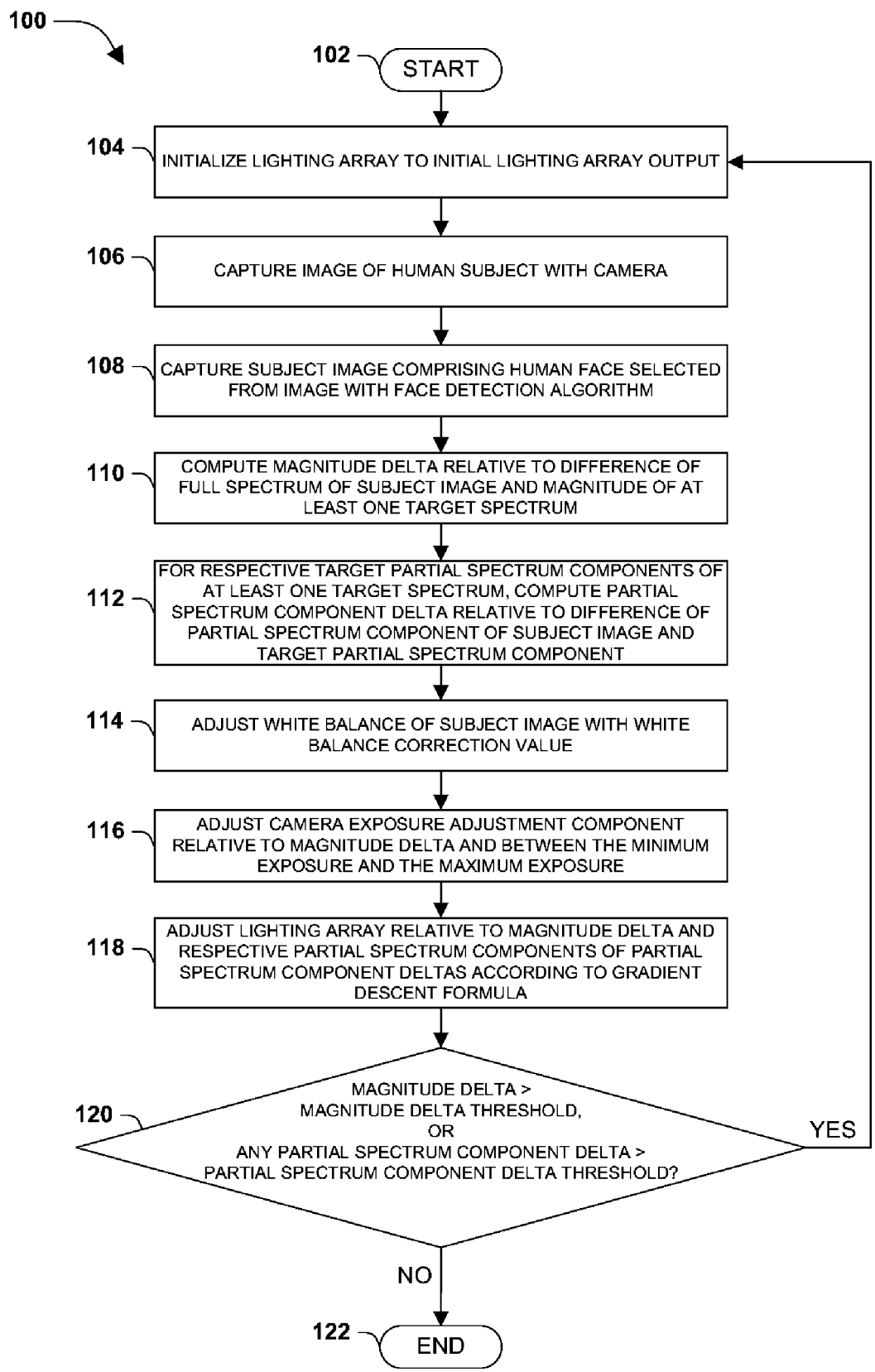
FIG. 6 is a flow diagram illustrating an exemplary method of controlling a lighting array to light a human face captured by a camera according to at least one target spectrum and a gradient descent algorithm.

FIG. 6 presents a flow diagram of an exemplary embodiment 100 of these techniques that includes several of the aspect variations described herein to achieve some of the advantages related thereto. The exemplary method 100 involves the controlling of a lighting array to light a human face of a human subject, which is captured by a camera featuring an exposure adjustment component having a minimum exposure and a maximum exposure. The lighting array utilized by the exemplary method 100 features a full spectrum lighting component (e.g., a white lighting component) and partial spectrum lighting components (e.g., a red lighting component, a green lighting component, and a blue lighting component.) The exemplary method 100 controls the lighting array with respect to a set of target spectra having at least one target partial spectrum component, which are derived by a trainable learning algorithm.

Within this environment, the exemplary method 100 of FIG. 6 begins at 102 and involves initializing the lighting array to an initial lighting array output 104, such as setting the full spectrum lighting component and the partial spectrum lighting components to a low output level, which may permit the following computations to reduce the output levels where desirable. The exemplary method 100 also involves the iterative capturing of images, computation of magnitude deltas and partial spectrum component deltas, and the adjustment of the camera exposure adjustment component and the lighting array in response thereto. Respective iterations of the exemplary method 100 begin with capturing an image of the human subject with the camera 106, and by capturing a subject image comprising the selecting of a human face from the image with a face detection algorithm 108. The iterations of the exemplary method 100 also involve computing a magnitude delta relative to the difference of the full spectrum of the subject image and the magnitude of the target spectra 110, and computing partial spectrum component deltas for respective target partial spectrum components of the target spectra relative to the difference of the partial spectrum components of the subject image and the target partial spectrum components 112. The iterations of the exemplary method 100 also include adjusting white balance of the subject image (or rather of the camera since white balance is a camera parameter like camera exposure) with a white balance correction value 114, which may be previously computed for the camera, computed during camera calibration, estimated based on a subject image, etc. The iterations of the exemplary method 100 also include adjusting the camera exposure adjustment component relative to the magnitude delta and between the minimum exposure and the maximum exposure 116, and adjusting the lighting array relative to the magnitude delta and the respective partial spectrum components of the partial spectrum component deltas according to a gradient descent formula 118. Following each iteration, the exemplary method tests whether the lighting array has been sufficiently adjusted with respect to the target spectra by determining whether the magnitude delta is less than a magnitude delta threshold, and/or whether the partial spectrum component deltas are less than a partial spectrum component delta threshold 120. If these parameters are not within acceptable limits, then the exemplary method 110 begins a new iteration by returning to 106; but if these parameters are within acceptable limits, the exemplary method 110 ends at 122.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of controlling a lighting array comprising at least one partial spectrum lighting component to light a subject captured by a camera according to at least one target spectrum having at least one target partial spectrum component, the method comprising:
    capturing a subject image with the camera;
    computing a magnitude delta relative to the difference of the magnitude of the spectrum of the subject image and the magnitude of the target spectrum;
    for respective target partial spectrum components of the target spectrum, computing a partial spectrum component delta relative to the difference of the partial spectrum component of the subject image and the target partial spectrum component; and
    adjusting the lighting array relative to the magnitude delta and the respective partial spectrum components of the partial spectrum component deltas.

2. The method of claim 1, the subject comprising a human face.

3. The method of claim 2, capturing the subject image comprising:
    capturing an image with the camera, and
    using a face recognition detection algorithm, selecting at least one human face as the subject image.

4. The method of claim 1:
    the lighting array comprising a full spectrum lighting component, and
    the method comprising: adjusting the full spectrum lighting component relative to the magnitude delta.

5. The method of claim 1, the partial spectrum lighting components comprising three complementary lighting components.

6. The method of claim 5, the three complementary lighting components comprising a red lighting component, a green lighting component, and a blue lighting component.

7. The method of claim 1:
    the camera comprising a camera exposure adjustment component, and
    the method comprising: adjusting the camera exposure adjustment component relative to the magnitude delta.

8. The method of claim 1, comprising: adjusting white balance of the subject image with a white balance correction value.

9. The method of claim 8:
the camera exposure adjustment component having a minimum exposure and a maximum exposure, and
the adjusting comprising: adjusting the camera exposure adjustment component relative to the magnitude delta and between the minimum exposure and the maximum exposure.

10. The method of claim 1, the at least one target spectrum derived according to a trainable learning algorithm.

11. The method of claim 1, the partial spectrum lighting component adjusting comprising an optimization formula.

12. The method of claim 11, the target spectrum comprising at least one target spectra, and the optimization formula comprising a gradient descent formula.

13. The method of claim 1, comprising:
initializing the lighting array to an initial lighting array output; and
iteratively capturing and adjusting the subject image with respect to a previous iteration while at least one of the magnitude delta exceeds a magnitude delta threshold and a partial spectrum component delta exceeds a partial spectrum component delta threshold.

14. The method of claim 13:
the lighting array comprising a white full spectrum component, a red partial spectrum component, a green partial spectrum component, and a blue partial spectrum component;
the adjusting comprising adjusting the voltage applied to the partial spectrum components and the full spectrum component;
and the computing performed according to the mathematical formula:

$$(v_r, v_g, v_b, v_w)^{i+1} = (v_r, v_g, v_b, v_w)^i - \gamma \nabla G$$

where:
$v_r$ represents a voltage applied to power a red lighting component of a lighting array;
$v_g$ represents a voltage applied to power a green lighting component of a lighting array;
$v_b$ represents a voltage applied to power a blue lighting component of a lighting array;
$v_w$ represents a voltage applied to power a full spectrum lighting component of a lighting array;
i represents an iteration of a lighting array control algorithm;
$(v_r, v_g, v_b, v_w)^i$ represents a voltage applied to power the red, green blue, and full spectrum lighting components of a lighting array for an iteration of a lighting array control algorithm;
γ represents an adjustment rate factor controlling the rate of change of the lighting array between iterations of a lighting array control algorithm;
G represents a gradient descent lighting array control formula comprising the mathematical formula:

$$G = \sum \left( \frac{1}{2}(I - I_t)^T (I - I_t) \right), t \in S,$$

where:
S represents the set of target spectra;
I represents a linear estimation of the red, green, blue, and white channels of an image resulting from applying voltages $v_r$, $v_g$, $v_b$, and $v_w$ to the red, green, blue, and white lighting components of the lighting array during an iteration of a lighting array control algorithm, comprising the mathematical formula:

$$I = k\rho \begin{bmatrix} A_{r1} & A_{g1} & A_{b1} & A_{w1} \\ A_{r2} & A_{g2} & A_{b2} & A_{w2} \\ A_{r3} & A_{g3} & A_{b3} & A_{w3} \end{bmatrix} \begin{bmatrix} v_r \\ v_g \\ v_b \\ v_w \end{bmatrix} + k\rho E^{room}$$

where:
k represents the camera exposure,
ρ represents the albedo of the subject,
$A_{r1}$, $A_{r2}$, etc. together represent a voltage-to-irradiance approximation of the red, green, blue, and white lighting array components of the lighting array, and
$E^{room}$ represents the irradiance of the scene; and
$I_t$ represents a target spectrum comprising red, green, and blue channels; and
∇G represents a gradient of a gradient descent lighting array control, comprising the mathematical formula:

$$\nabla G = \begin{bmatrix} \frac{\partial G}{\partial v_r} & \frac{\partial G}{\partial v_g} & \frac{\partial G}{\partial v_b} & \frac{\partial G}{\partial v_w} \end{bmatrix}^T.$$

15. A system for lighting a subject captured by a camera in a subject image, the system comprising:
a target spectrum memory configured to store at least one target spectrum having at least one target partial spectrum component;
a lighting array configured to light the subject comprising at least one partial spectrum lighting component; and
a lighting array control component configured to:
compute a magnitude delta relative to the difference of the magnitude of the spectrum of the subject image and the magnitude of the at least one target spectrum;
for respective target partial spectrum components of the target spectrum, compute a partial spectrum component delta relative to the difference of the partial spectrum component of the subject image and the target partial spectrum component; and
adjust the partial spectrum lighting components of the lighting array relative to the magnitude delta and respective partial spectrum components of the partial spectrum component deltas.

16. The system of claim 15:
the lighting array comprising a full spectrum lighting component,
and the lighting array control component configured to adjust the full spectrum lighting component relative to the magnitude delta.

17. The system of claim 15, the partial spectrum lighting components comprising a red lighting component, a green lighting component, and a blue lighting component.

18. The system of claim 15, comprising:
a camera exposure adjustment component operably coupled to the camera, and
a camera exposure adjustment control component configured to adjust the camera exposure adjustment component relative to the magnitude delta.

19. The system of claim 15, the lighting array control component configured to iteratively capture and adjust the subject image while at least one of the magnitude delta exceeds a magnitude delta threshold and a partial spectrum component delta exceeds a partial spectrum component delta threshold.

20. A method of controlling a lighting array to light a human face of a human subject captured by a camera including an exposure adjustment component having a minimum exposure and a maximum exposure, the lighting array comprising a full spectrum lighting component including a white lighting component and partial spectrum lighting components including a red lighting component, a green lighting component, and a blue lighting component, the adjusting according to a set of target spectra derived by a trainable learning algorithm and having at least one target partial spectrum component, and the method comprising:

initializing the lighting array to an initial lighting array output; and iteratively controlling the lighting array, respective iterations comprising:

capturing an image of the human subject with the camera;

capturing the subject image comprising a human face selected from the image with a face detection algorithm;

computing a magnitude delta relative to the difference of the magnitude of the spectrum of the subject image and the magnitude of the target spectrum;

for respective target partial spectrum components of the target spectrum, computing a partial spectrum component delta relative to the difference of the partial spectrum component of the subject image and the target partial spectrum component;

adjusting white balance of the subject image with a white balance correction value;

adjusting the camera exposure adjustment component relative to the magnitude delta and between the minimum exposure and the maximum exposure; and adjusting the lighting array relative to the magnitude delta and the respective partial spectrum components of the partial spectrum component deltas according to a gradient descent formula, while at least one of the magnitude delta exceeds a magnitude delta threshold and a partial spectrum component delta exceeds a partial spectrum component delta threshold.

* * * * *